United States Patent [19]

Suzuki et al.

[11] Patent Number: 5,091,734
[45] Date of Patent: Feb. 25, 1992

[54] COLOR IMAGE RECORDING UTILIZING COLOR CORRECTION IN ACCORDANCE WITH A PREDETERMINED ORDER OF RECORDING OF MULTIPLE COLOR AGENTS

[75] Inventors: Akio Suzuki, Tokyo; Masaharu Ohkubo; Yoshihiro Takada, both of Yokohama, all of Japan

[73] Assignee: Canon Kabushiki Kaisha, Tokyo, Japan

[21] Appl. No.: 676,480

[22] Filed: Mar. 27, 1991

Related U.S. Application Data

[63] Continuation of Ser. No. 368,109, Jun. 20, 1989, abandoned, which is a continuation of Ser. No. 87,313, Aug. 20, 1987, abandoned.

[30] Foreign Application Priority Data

Aug. 25, 1986 [JP]  Japan .................... 61-197202

[51] Int. Cl.$^5$ .................... B41J 2/21; H04N 1/46
[52] U.S. Cl. .................... 346/1.1; 346/140 R; 358/80; 358/298
[58] Field of Search .................... 346/1.1, 140; 358/75, 358/78, 80, 296, 298

[56] References Cited

U.S. PATENT DOCUMENTS

| 4,614,967 | 9/1986 | Sayanagi | 358/75 |
| 4,631,578 | 12/1986 | Sasaki | 358/80 |
| 4,636,844 | 1/1987 | Sasaki | 358/80 |
| 4,643,563 | 2/1987 | Sayanagi | 355/77 |
| 4,682,186 | 7/1987 | Sasaki | 346/140 |
| 4,682,216 | 7/1987 | Sasaki | 358/79 |
| 4,745,466 | 5/1988 | Yoshida et al. | 358/80 |
| 4,772,911 | 9/1988 | Sasaki | 346/140 |
| 4,814,891 | 3/1989 | Uchiyama | 358/296 |
| 4,829,323 | 5/1989 | Suzuki et al. | |
| 4,853,768 | 8/1989 | Suzuki et al. | |

FOREIGN PATENT DOCUMENTS

| 3408108A | 6/1984 | Fed. Rep. of Germany | |
| 195364 | 11/1983 | Japan | 358/80 |
| 132463 | 7/1985 | Japan | 358/80 |
| 2141001A | 12/1984 | United Kingdom | |

Primary Examiner—Joseph W. Hartary
Attorney, Agent, or Firm—Fitzpatrick, Cella, Harper & Scinto

[57] ABSTRACT

A color image recording apparatus such as an ink jet printer forms color image by depositing a plurality of colored inks on a recording medium in a predetermined order. The apparatus includes a device, such as an image reader or a memory, for inputting a plurality of first color component signals that correspond to the plurality of colored inks. The first color component signals are color masked to generate second color component signals to be used for recording, at least one of the second color component signals being corrected in accordance with the predetermined order of recording.

18 Claims, 6 Drawing Sheets

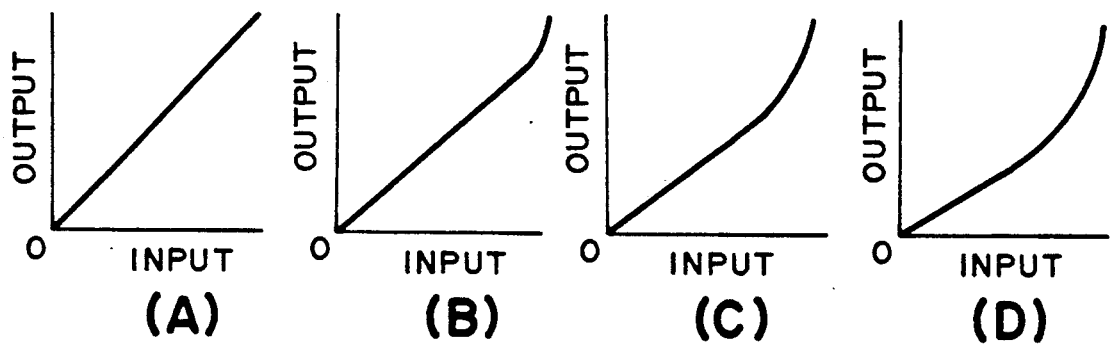
F I G. 2
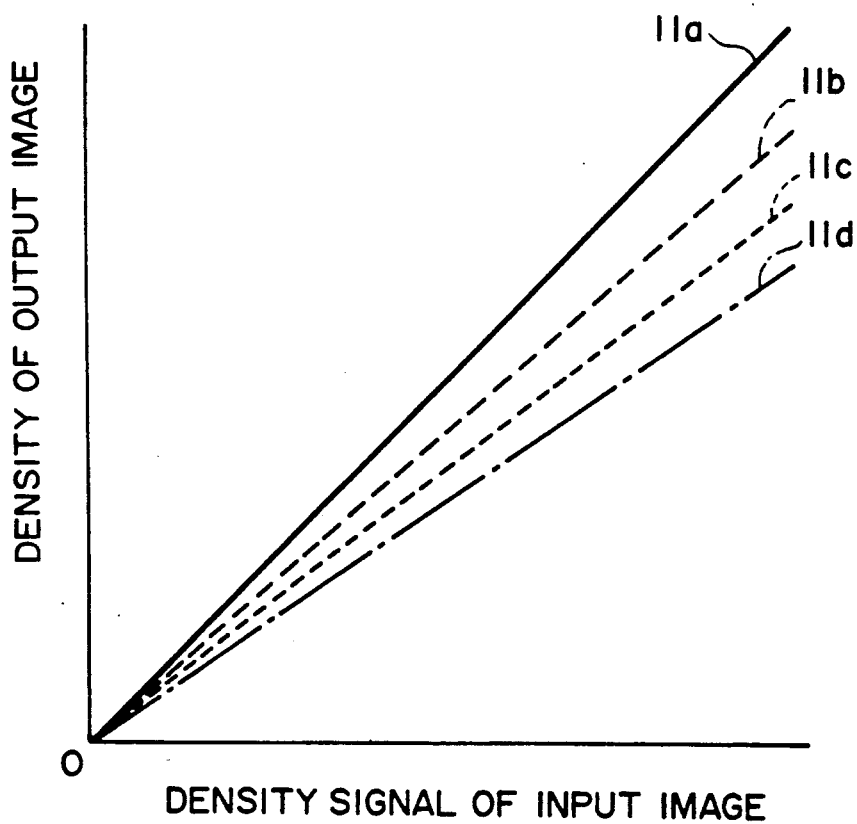
F I G. 3

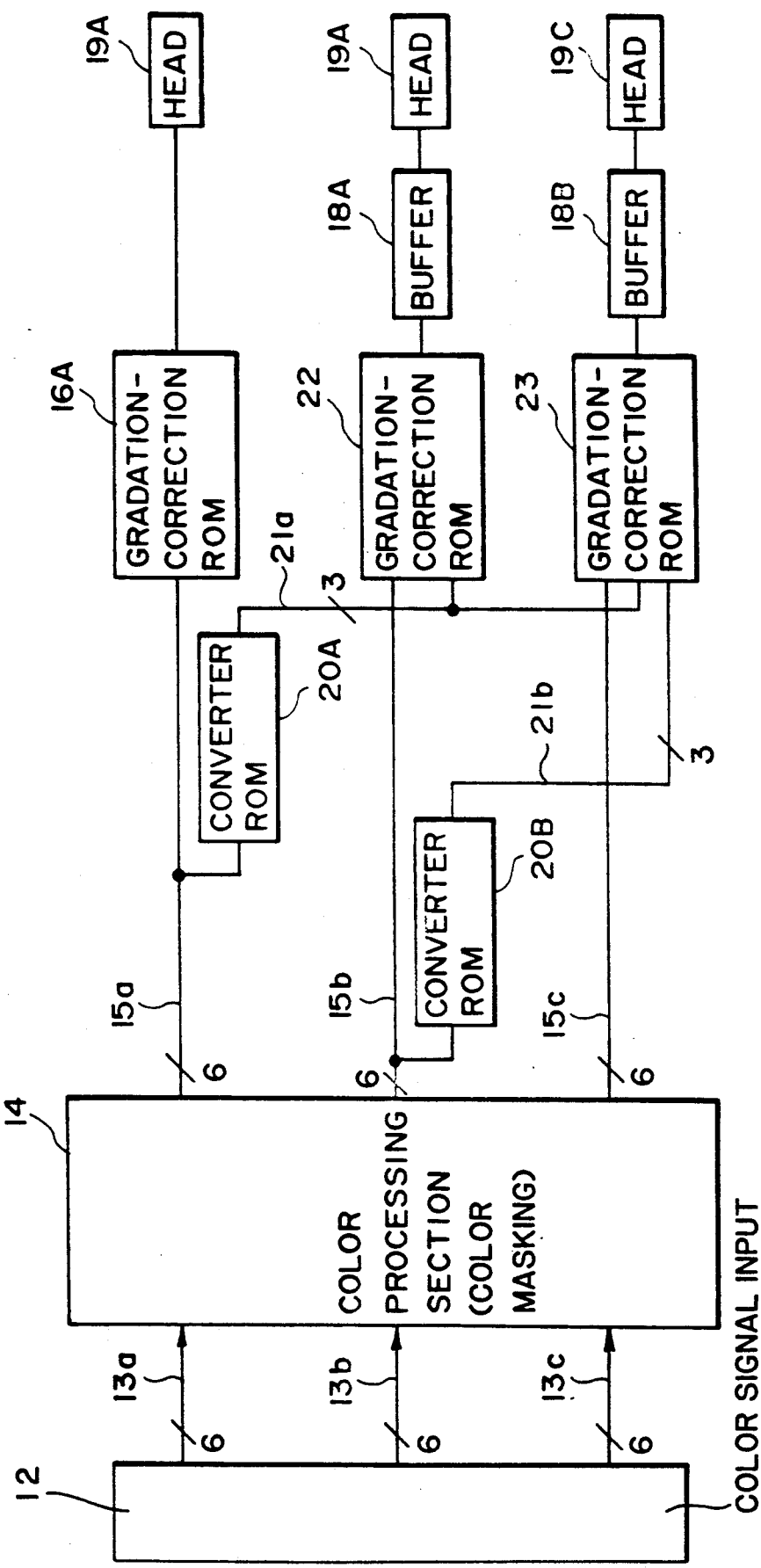
F I G. 4

COLOR IMAGE RECORDING UTILIZING COLOR CORRECTION IN ACCORDANCE WITH A PREDETERMINED ORDER OF RECORDING OF MULTIPLE COLOR AGENTS

This application is a continuation of application Ser. No. 07/368,109, filed on June 20, 1989, which is a continuation of application Ser. No. 07/087,313, filed Aug 20, 1987, both now abandoned.

BACKGROUND OF THE INVENTION

1. Field of the Invention

The present invention relates to an image recording apparatus and, more particularly, to a color image recording apparatus for forming a color image by printing inks of a plurality of colors.

2. Related Background Art

Hitherto, an ink jet recording apparatus for forming an image by spouting ink from nozzles each having a small diameter has been well known. The ink jet recording apparatus is widely used as a color image recording apparatus because a color image can be easily obtained by overlapping printing inks of a plurality of colors.

FIG. 5 shows a scanning method of ink jet heads in the case of obtaining a color image by overlapping the inks of three colors of yellow, magenta, and cyan.

In the diagram, reference numeral 1A, 1B, and 1C denote multi-nozzle heads which are arranged at a distance d from each other. These heads are scanned on a recording sheet 3 at a velocity v in the direction of an arrow 4 while spouting ink from orifices 2.

The head 1A is used for the yellow ink. The head 1B is used for the magenta ink. The head 1C is used for the cyan ink. The inks are printed on the recording sheet 3 in accordance with the order of yellow, magenta, and cyan.

FIG. 6 is a block diagram for the image signal processes by the foregoing ink jet recording apparatus. Input signals 5a to 5c indicative of image densities of three colors of yellow, magenta, and cyan are supplied to a color processing section 6 and subjected to color processes such as masking process and the like. Thereafter, the color processed signals are input to a gradation-correction section 7 and are γ corrected. Among the three-color signals after the correction, the yellow signal is directly sent to a recording head 9A. However, the magenta and cyan signals are first stored into buffers 8A and 8B and thereafter, they are delayed by the times corresponding to a distance d in the scanning direction of the recording head, i.e., by only the time of d/v in the case of the magenta signal and by only the time of 2d/v in the case of the cyan signal. The delayed magenta and cyan signals are sent to heads 9B and 9C. Thus, the inks of the respective colors of yellow, magenta, and cyan are printed on the same position on the recording sheet 3 and a color image is reproduced.

In the gradation-correction section 7, the γ correction is performed in such a manner that the relation of the image density of the printed image for the input image density signal is linear with respect to each color of yellow, magenta, and cyan. The γ characteristics after the correction of yellow, magenta, and cyan become as shown in FIG. 7.

However, these γ characteristics are obtained in the case where the inks of yellow, magenta, and cyan were printed by a single color, respectively. The γ characteristics in the case of two or three colors differ from them.

In the case of the mixed colors, the γ characteristic of each color component depends on the amount of ink which was previously printed.

FIG. 8 shows a change in γ characteristic of magenta to the amount of yellow in which has previously been printed. In FIG. 8, reference numeral 10a denotes a γ characteristics of magenta in the case where the magenta ink was first printed without printing the yellow ink. With an increase in print amount of yellow ink, the γ characteristic of the magenta ink changes as shown in 10b to 10d.

This change is not concerned with the kind of ink. The same tendency is obtained if the printing order is the second or subsequent orders.

It is considered that this phenomenon occurs by the nonlinear mechanism when the ink is absorbed into a sheet. However, the relation between the output image density signal and the color component of the output image becomes nonlinear due to such a phenomenon. There is a drawback such that the color reproduction cannot be sufficiently performed by the linear color correcting processes such as linear masking method and the like. For example in the case of the ordinary linear masking method, when it is assumed that the input yellow, magenta, and cyan signals are set to Y, M, and C, the conversion is performed as follows.

$$Y' = a_{11}Y - a_{12}M - a_{13}C$$

$$M' = a_{21}Y + a_{22}M - a_{23}C$$

$$C' = a_{31}Y - a_{32}M + a_{33}C$$

However, according to this method, the relation of the output signal to the input signal is linear and it is impossible to correct the printer characteristic which changes nonlinearly in accordance with an amount of ink which has previously been printed.

To eliminate the above drawback, a method whereby the nonlinear conversion is performed for the input signal has been proposed. However, this method has a drawback such that a constitution of the apparatus becomes complicated and the cost increases.

As examples of performing the nonlinear conversion to the input signal, there have been proposed the techniques discussed in U.S. Pat. No. 4,614,967, U.S. Pat. No. 4,683,492, U.S. Pat. No. 4,643,563, U.S. Pat. No. 853,768, U.S. Pat. No. 4,631,578 and the like.

SUMMARY OF THE INVENTION

It is an object of the present invention to provide a color image recording apparatus which can eliminate the foregoing drawbacks of the conventional apparatuses and can obtain a color image of a high quality.

Another object of the invention is to obtain a good gradation property and good color reproducibility in cases of both the single-color printing and the mixed-color printing.

Still another object of the invention is to provide a color image recording apparatus which can obtain good gradation property and good color reproducibility by changing the gradation correction in accordance with an amount of coloring agent which has previously been printed.

In more detail, an image recording apparatus of the invention is characterized by having means for detecting an amount of coloring agent which has previously been printed and means for performing a different gradation correction in accordance with the result of the detection of the detecting means.

The above and other objects and features of the present invention will become apparent from the following detailed description and the appended claims with reference to the accompanying drawings.

BRIEF DESCRIPTION OF THE DRAWINGS

FIGS. 2(A) to 2(D) are γ correction curves according to the invention, respectively;

FIG. 3 is a γ characteristic diagram in the case of the mixed-color printing according to the invention;

FIG. 4 is an image processing block diagram of the second embodiment of the invention;

DETAILED DESCRIPTION OF THE PREFERRED EMBODIMENTS

Figure 1:
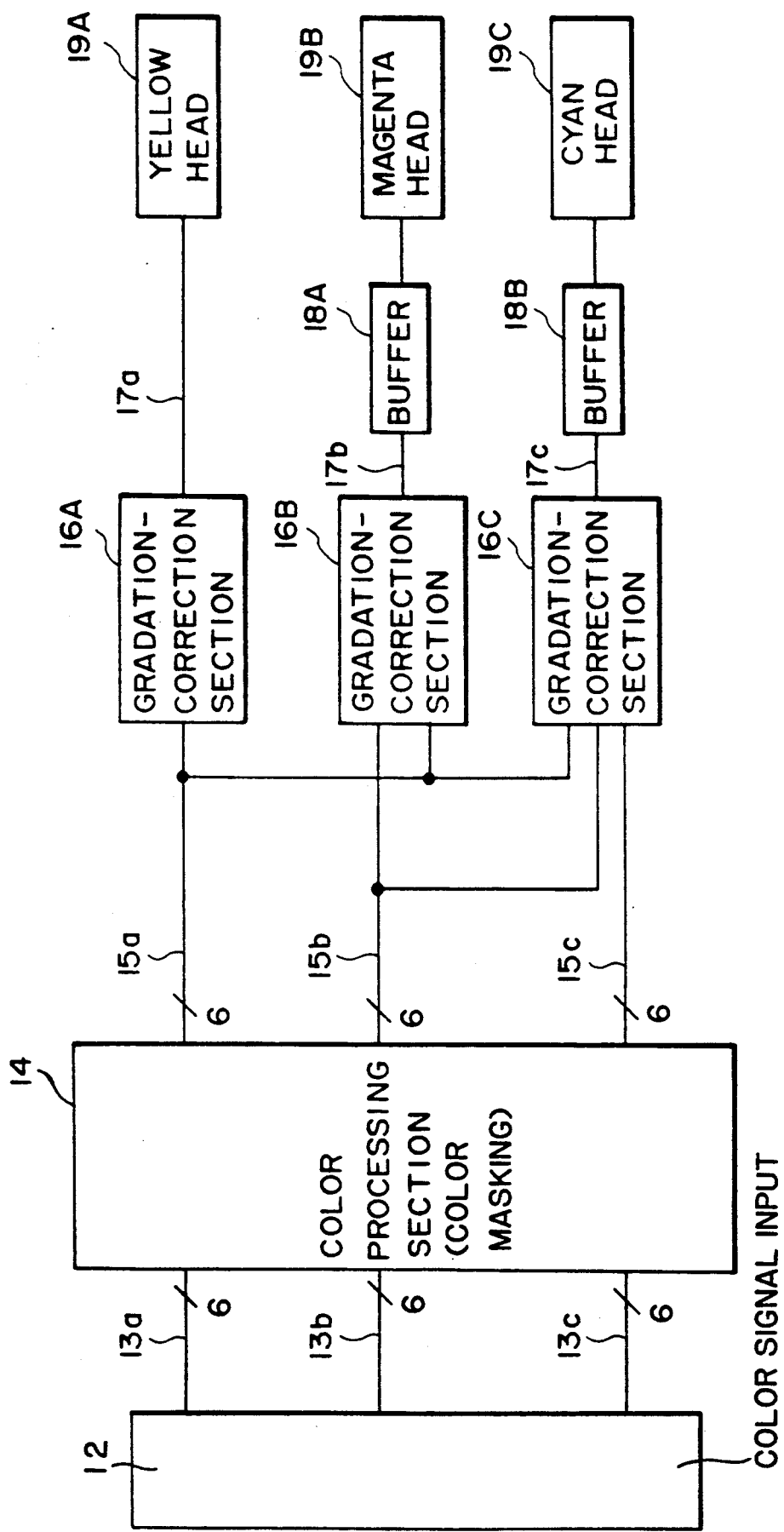
FIG. 1 is an image processing block diagram of the first embodiment of an image recording apparatus according to the present invention.
Figure 5:
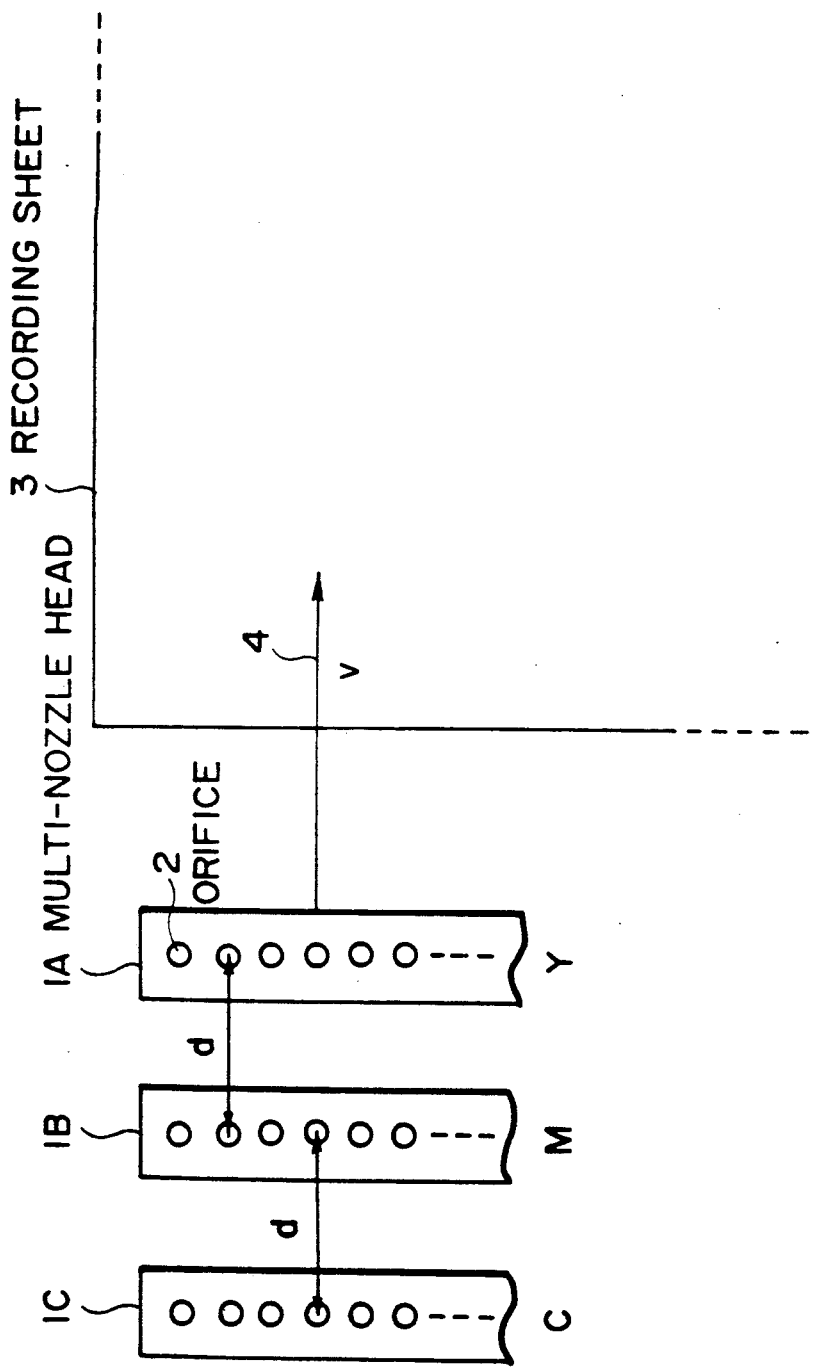
FIG. 5 is a diagram showing an arrangement of recording heads and the scanning direction.
Figure 6:
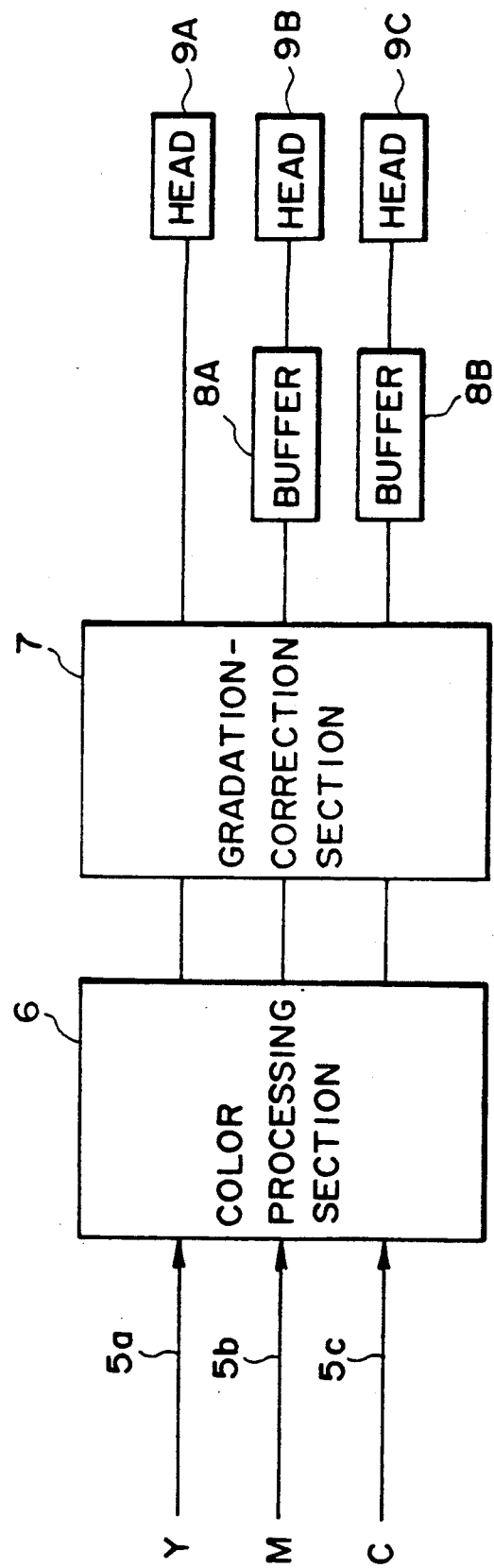
FIG. 6 is an image processing block diagram of a conventional image recording apparatus.
Figure 7:
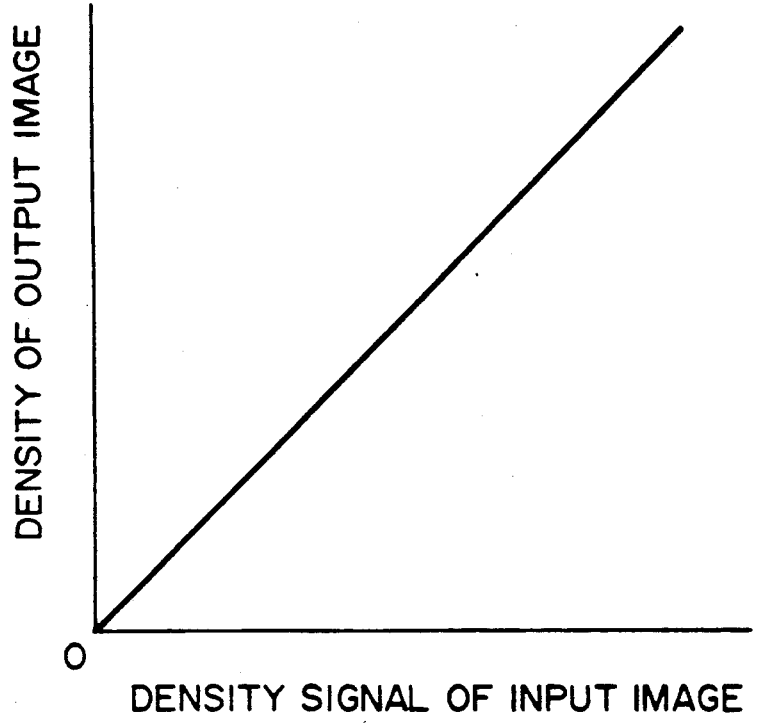
FIG. 7 is a γ characteristic diagram in the case of the single-color printing.

FIG. 1 is an image signal processing block diagram of the first embodiment of an image recording apparatus according to the present invention. In the embodiment, it is assumed that the ink jet heads are arranged and scanned as shown in FIG. 5. Namely, the inks are printed in the order of yellow, magenta, and cyan.

In FIG. 1, reference numerals 13a, 13b and 13c denote digital input signals of yellow, magenta, and cyan each consisting of six bits. The first color component signals are input from an image reading apparatus, an image data storage device, or other color signal input means 12 to a color processing section 14. The color processing section 14 performs the color processes such as a masking process and the like to those signals and generates respective second color component signals 15a, 15b, and 15c of yellow, magenta, and cyan after the color processes as six-bit digital data.

The yellow signal 15a to be printed first is input as the address data of a gradation-correction ROM 6A. The value which is obtained by multiplying a γ coefficient is used to address the value stored in an address of the table in the ROM 16A. The signal 15a is γ corrected on the basis of these values.

Together with the magenta signal 15b, the yellow signal 15a is input as the address data to a gradation-correction ROM 16B for magenta.

The values which are obtained by multiplying a γ coefficient to the magenta signal 15b are also stored in the gradation-correction ROM 16B. However, a plurality of kinds γ correction are prepared as shown in FIGS. 2(A) to 2(D) instead of only one kind. The optimum γ correction is selected by the yellow signal 15a. There is selected such a γ correction curve as to obtain the linear γ characteristic of magenta when the yellow signal has previously been printed.

Thus, even if a print amount of yellow ink changed, the γ characteristic of magenta is always linear as shown in straight lines 11a to 11d in FIG. 3.

The yellow signal 15a and magenta signal 15b together with the cyan signal 15c are also input to a gradation-correction ROM 16C. The optimum γ correction curve is selected by the signals 15a and 15b and the gradation is corrected.

Among respective color signals 17a to 17c which were gradation corrected in this manner, the yellow signal is directly sent to a head 19A. However, the magenta signal 17b and cyan signal 17c are sent to buffers 18A and 18B and are delayed by the time corresponding to the distance between the heads and thereafter, they are supplied to heads 19B and 19C. The inks of respective colors are printed, so that a color image is reproduced.

Figure 8:
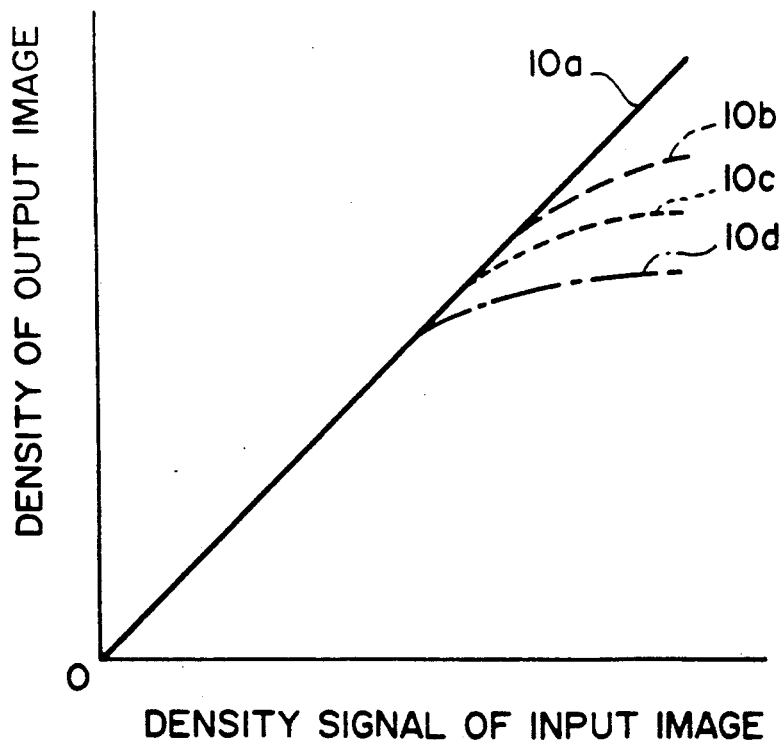
FIG. 8 is a γ characteristic diagram in the case of the mixed-color printing in a conventional apparatus.

As described above, by performing the optimum γ correction in accordance with the size of image signal of the color ink which has previously been printed, even if the amount of ink to be previously printed changed, the linear γ characteristic is always obtained. FIG. 3 shows a situation in this case. When the γ characteristic changes as shown at 10a to 10d in FIG. 8 due to the amount of ink to be previously printed, by performing the γ correction as shown in FIGS. 2(A) to 2(D), the linear γ characteristics are always derived as shown in the straight lines 11a to 11d in FIG. 3.

As described above, when the γ characteristic of the output is linear, an image having a good gradation is obtained. The accurate color correction by the ordinary linear masking method can be performed. A color image can be reproduced with a good accuracy.

The second embodiment will now be described. In the foregoing first embodiment, the image data to be previously printed is directly used as a selection signal to select the optimum γ correction curve. However, in the second embodiment, the image data to be previously printed in once converted into the data consisting of a smaller number of bits and thereafter, the converted data is used as the selection signal.

FIG. 4 shows a schematic diagram in such a case. In FIG. 4, the same parts and components as those shown in FIG. 1 are designated by the same reference numerals.

Among the signals from the color signal input means 12 processed by the color processing section 14, the yellow signal to be printed first is input to the gradation-correction ROM 16A and is also input to a converter ROM 20A and converted into a signal 21a consisting of a smaller number of bits. The number of bits of the signal 21a is determined in accordance with the number of γ correction curves to be prepared for the magenta and cyan signals. For example, even if the signal 15a consists of six bits and represents 64 gradations, there is no need to prepare 64 kinds of γ correction curves to be prepared for magenta and cyan. In general, it is sufficient to prepare about eight kinds of γ correction curves. In this case, the number of bits of the signal 21a is set to 3. This 3-bit signal is used as the selection signal of the γ correction curve and input to the gradation-correction ROM for magenta, so that eight kinds of curves can be selected.

The magenta signal 15b is also converted into a selection signal 21b consisting of a smaller number of bits by a converter ROM 20B. The γ correction curve for cyan is selected by the signals 21a and 21b.

In the forgoing constitution, the number of bits of the selection signal is set to the necessary minimum number, so that there is an advantage such that it is sufficient that the memory capacity of the gradation correction ROM is small.

As in the first embodiment, in the case of directly using the 6-bit image signal as the selection signal, the memory capacity of the γ correction ROM for magenta needs $2^{12} \times 6 = 24,576$, bits since the input signal consists of 12 bits and the output signal consists of 6 bits. The memory capacity of the ROM for cyan needs $2^{18} \times 6 = 1,572,864$ bits since the input signal consists of 18 bits and the output signal consists of 6 bits.

However, in the second embodiment, since the 6-bit signal is converted into the 3-bit signal, the memory capacity of the gradation-correction ROM for magenta needs $2^9 \times 6 = 3,072$ bits since the input signal consists of 9 bits and the output signal consists of 6 bits. The memory capacity of the ROM for cyan needs 24,576 bits since the input signal consists of 12 bits and the output signal consists of 6 bits. In addition to these bits, $2^6 \times 3 = 192$ bits for the 6-bit input signal and 3-bit output signal are also necessary as a dividing ROM for yellow and magenta, respectively. However, as a whole capacity, the memory capacity of $(24,576 + 1,572,864) - (3,072 + 24,576 + 192 \times 2) = 1,569,408$ bits can be saved.

On the other hand, in each of the foregoing embodiments, there is used the γ correction such that the γ coefficient is multiplied to the input signal and the resultant data is output. However, in a recording apparatus such that output gradations are derived by a dither method, by operating a threshold value of a dither matrix without changing a γ coefficient, the similar effect can be derived. For example, when the dither threshold values are set at regular intervals, if it is assumed that the γ characteristic as shown in FIG. 2(A) are obtained, by setting the interval between the dither threshold values to a wide value in the low density portion and to a narrow value in the high density portion, the γ characteristic as shown in FIG. 2(B), 2(C), or 2(D) can be obtained.

Therefore, even by preparing a few kinds of dither matrices of magenta and cyan and by switching them by a selection signal, the present invention can be also embodied.

Although in the foregoing embodiments, the number of kinds of inks has been set to three colors of yellow, magenta, and cyan the invention can be also similarly applied to the case where the inks of four colors of yellow, magenta, cyan and black are used. The printing order of the inks is not limited to the foregoing order of yellow→magenta→cyan but can be arbitrarily set. In addition, although the invention has been described with respect to the example of the ink jet recording, the invention is not limited to the ink jet recording but can be also applied to the printers such as thermal copy transfer type printer, electrophotographic printer, and the like in which each coloring agent is sequentially formed.

As described above, in the recording apparatus such that a color image is obtained by sequentially printing the inks of a plurality of colors, the good gradation property and good color reproducibility can be obtained by changing the gradation correction in accordance with an amount of coloring agent which has previously been printed.

The present invention is not limited to the foregoing embodiments but many modifications and variations are possible within the spirit and scope of the appended claims of the invention.

We claim:

1. A color image processing method comprising the steps of:
    inputting a plurality of first color component signals corresponding to a plurality of coloring agents;
    generating a plurality of second color component signals by color making said first color component signals, said second color component signals to be used for recording an image by depositing said plurality of coloring agents in a predetermined order of recording and in a superposed orientation;
    gradation correcting at least one of said second color component signals in accordance with said predetermined order of recording, said second color component signals being gradation corrected according to a quantity of said coloring agents used in a prior recording; and
    recording the image in response to said gradation corrected second color component signals by using said plurality of coloring agents and by depositing said coloring agents in said predetermined order and in said superposed orientation.

2. A color image processing method according to claim 1, wherein said first color component signals are supplied from an image reading apparatus.

3. A color image processing method according to claim 1, wherein said generating step utilizes a linear masking circuit.

4. A color image processing method according to claim 1, wherein said correcting step utilizes a memory for storing a table of values.

5. A color image processing method according to claim 1, further comprising said step of printing in response to a corrected second color component signals.

6. A color image processing method according to claim 5, wherein said printing step utilizes ink jet recording.

7. A color image processing method according to claim 6, wherein said ink jet recording is performed by an ink jet device with multiple heads.

8. A color recording apparatus for recording, the apparatus comprising:
    color signal input means for supplying a plurality of first color component signals corresponding to a plurality of coloring agents;
    generating means for generating a plurality of second color component signals, said second color component signals being generated by color masking said first color component signals, said second color component signals to be used for recording an image by depositing said plurality of coloring agents in a predetermined order of recording and in a superposed orientation;
    correcting means for gradation correcting at least one of said second color component signals in accordance with said predetermined order of recording, said second color component signals being gradation corrected according to a quantity of said coloring agents used in a prior recording; and
    recording means for recording the image in response to said gradation corrected second color component signals, said recording means recording by using said plurality of coloring agents and by depositing said coloring agents in said predetermined order and in said superposed orientation.

9. A color recording apparatus according to claim 8, wherein said generating means includes a linear masking processing circuit.

10. A color image recording apparatus according to claim 8, wherein said correcting means includes a memory for storing a table of values having predetermined addresses, the addresses of values stored in said memory correspond to said second color component signals and said values stored in said memory correspond to outputs therefrom.

11. A color image recording apparatus according to claim 1, wherein said input means includes an image reading apparatus.

12. A color image recording apparatus according to claim 8, wherein said correcting means corrects the level of a second color component signal to be subsequently printed in accordance with the level of a second color component signal that was previously printed.

13. A color image recording apparatus according to claim 12, wherein said correcting means includes a memory for storing a table of values having predetermined addresses, the addresses of values stored in said memory correspond to second color component signals and values stored in said memory correspond to outputs therefrom.

14. A color image recording apparatus according to claim 13, wherein said memory is provided for at least one of the second color component signals.

15. A color image recording apparatus according to claim 1, wherein each of said second color component signals comprises a digital signal having a predetermined number of bits and said correcting means includes means for reducing the number of bits of a second color component signal that was previously printed.

16. A color image recording apparatus according to claim 1, further comprising printing means for printing on the basis of said second color component signals corrected by said correcting means.

17. A color image recording apparatus according to claim 16, wherein said printing means includes an ink jet recording device.

18. A color image recording apparatus according to claim 17, wherein said ink jet recording device includes multiple ink jet heads.

* * * * *

UNITED STATES PATENT AND TRADEMARK OFFICE
CERTIFICATE OF CORRECTION

PATENT NO. : 5,091,734
DATED : February 25, 1992
INVENTOR(S) : AKIO SUZUKI ET AL.

It is certified that error appears in the above-identified patent and that said Letters Patent is hereby corrected as shown below:

COLUMN 1

Line 28, "numeral 1A," should read --numerals 1A,--.

COLUMN 2

Line 7, "characteristics" should read --characteristic--.
Line 48, "853,768," should read --4,853,768,--.

COLUMN 3

Line 36, "yellow,magenta" should read
    --yellow, magenta--.
Line 47, "ROM 6A." should read --ROM 16A.--.
Line 58, "kinds" should read --kinds of--.

COLUMN 4

Line 6, "signal" should read --signal 17a--.
Line 34, "in once" should read --is first--.

COLUMN 5

Line 17, "$2^{6x3=192}$ bits" should read --$2^6 \times 3 = 192$ bits--.
Line 32, "are" should read --is--.
Line 45, "cyan the" should read --cyan, the--.

UNITED STATES PATENT AND TRADEMARK OFFICE
CERTIFICATE OF CORRECTION

PATENT NO.   : 5,091,734
DATED        : February 25, 1992
INVENTOR(S)  : AKIO SUZUKI ET AL.

It is certified that error appears in the above-identified patent and that said Letters Patent is hereby corrected as shown below:

<u>COLUMN 6</u>

Line 6,  "color making" should read --color masking--.
   Line 32, "said" should read --a--.
   Line 33, "a" should read --said--.
   Line 40, "color recording apparatus" should read
            --color image recording apparatus--.

<u>COLUMN 7</u>

Line 10, "claim 1," should read --claim 8,--.

<u>COLUMN 8</u>

Line 7,  "claim 1," should read --claim 8,--.
   Line 14, "claim 1," should read --claim 8,--.

Signed and Sealed this

Seventh Day of December, 1993

Attest:

BRUCE LEHMAN

*Attesting Officer*     Commissioner of Patents and Trademarks